Patented Aug. 7, 1945

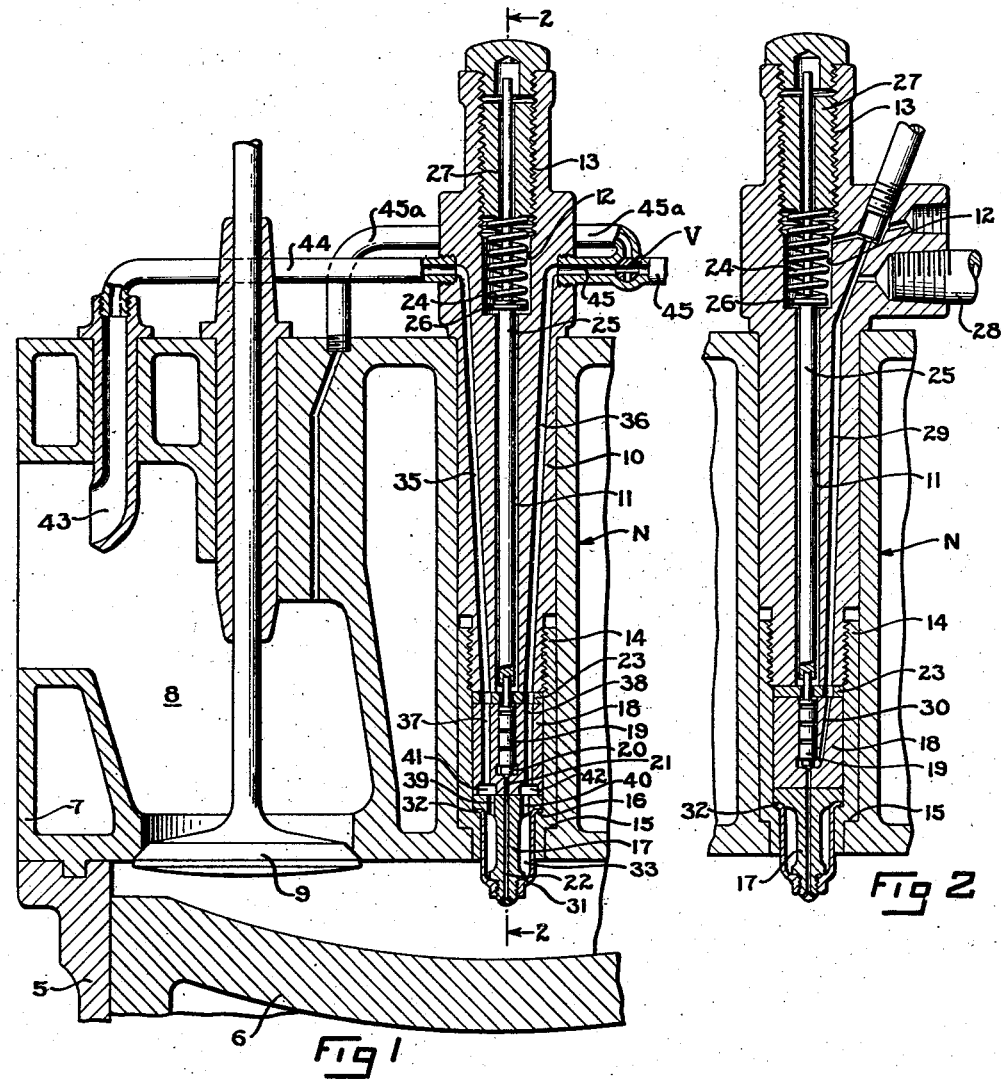
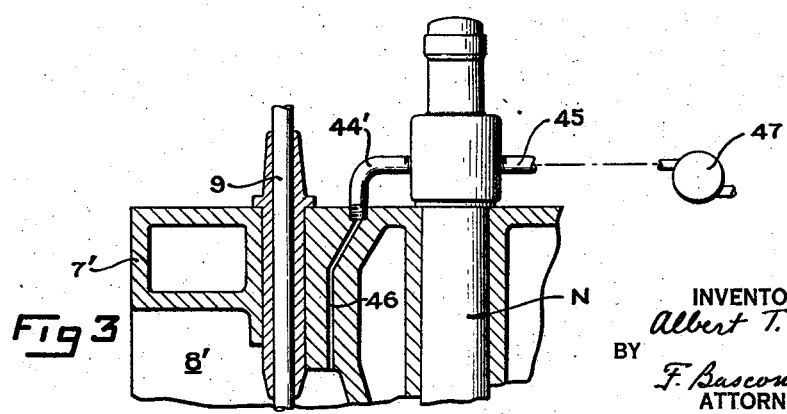

2,381,804

UNITED STATES PATENT OFFICE 2,381,804

COOLING SYSTEM FOR FUEL INJECTION NOZZLES

Albert T. Bremser, Sidney, N. Y., assignor to Bendix Aviation Corporation, South Bend, Ind., a corporation of Delaware Application January 30, 1941, Serial No. 376,625

4 Claims. (Cl. 123—32)

This invention relates to internal combustion engines, and more particularly to means for controlling the temperature of fuel injection nozzles in solid fuel injection engines.

It has been heretofore proposed to cool fuel injection nozzles by circulating a liquid through or around the same, but this method of cooling has not proved entirely satisfactory in modern engines wherein low weight and small size per unit of power is of prime importance. Means heretofore provided for this purpose have either entailed large, complicated units requiring the provision of large openings in the cylinder head, thereby reducing the strength of the cylinder and the available space for intake and exhaust passages, or the provision of such small cooling passages that insufficient cooling was effected and scaling or corrosion tended to clog the circulating system.

It is accordingly an object of the present invention to provide a novel cooling system for fuel injection nozzles wherein the foregoing disadvantages are overcome.

Another object of the invention is to provide novel means for cooling fuel injection nozzles by the passage of air therethrough.

A further object is to provide novel means for supplying a gaseous cooling medium to a fuel injection nozzle.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference for this latter purpose being had primarily to the appended claims.

In the drawing, wherein like reference characters refer to like parts throughout the several views, Fig. 1 is a detail sectional view, with parts broken away, illustrating a portion of one cylinder of an internal combustion engine having one form of the invention incorporated therein;

Fig. 2 is a sectional view of the injection nozzle of Fig. 1, the section being taken substantially on line 2—2 of Fig. 1; and, Fig. 3 is a detail view, partly in section and with parts broken away, illustrating another embodiment of the invention.

As illustrated in Figs. 1 and 2, by way of example, one embodiment of the invention is combined with an engine cylinder 5 in which a piston 6 may be reciprocated in the usual manner. Mounted on the cylinder is a cylinder head which is provided with an intake passage 8 controlled by a poppet valve 9 and an exhaust passage (not shown) that may be diametrically disposed with respect to passage 8.

Centrally disposed in cylinder head 7 is a fuel injection nozzle N which is so constructed that a cooling medium may be advantageously circulated therethrough. The particular nozzle illustrated, by way of example, is disclosed and claimed in my prior copending application, Serial No. 360,729, filed October 11, 1940, and comprises a nozzle holder body 10 having a relatively small external diameter and a central bore 11 which is enlarged at 12 and threaded at 13 for a purpose to hereinafter appear. Threadedly secured to the reduced lower end of body 10 is a tubular spray-tip holder or sleeve nut 14 which is provided with an external peripheral shoulder 15 that is adapted to engage an internal shoulder in the receiving opening provided in cylinder head 7 for nozzle N.

Interposed between the lower end of body 10 and an internal shoulder 16 in tip holder 14 and extending downwardly through a reduced portion of said holder is a spray tip 17 and a valve guide 18. The latter has a sliding fit in nut 14 and is provided with a central bore in which a valve 19 is slidably received. A reduced portion adjacent the lower end of valve 19 is surrounded by an enlarged bore in member 18, thereby forming a fuel pressure chamber 20, and the cone-shaped lower end of the valve is adapted to engage a valve seat in the guide member to thereby control the flow of fuel through a passage 21 into a central passage 22 of spray tip 17 and thence into the combustion chamber of cylinder 5.

For the purpose of limiting the opening movement of valve 19 to thereby prevent the injection of excessive charges of fuel and, hence, increase the efficiency and operating characteristics of the engine in which the nozzle is employed, particularly over long periods of use, a relatively thin metallic plate 23 is interposed between member 18 and body 10. Said plate has a central opening through which a reduced portion of valve 19 freely extends but which has a diameter somewhat less than the main body portion of said valve. Plate 23 is preferably made of hard, close-grained steel, or of suitable hardened metal which will resist wear or internal structural collapse during the continuous hammering of valve 19 against the same.

Valve 19 is normally held in seated or closed position by suitable resilient means, such as coil spring 24, which applies yielding pressure to the valve through the medium of a pressure pin or spindle 25, that freely extends through central bore 11 in body 10. The lower end of spindle or rod 25 is preferably recessed for freely receiving the reduced upper end of valve 19 so that there will be little or no tendency toward biasing the valve in its guide 18. Said spindle is provided adjacent its upper end with a collar 26 on which one end of spring 24 is seated and the other end of the spring engages the inner end of a plug nut or adjusting screw 27 which is externally threaded to engage screw threads 13.

Liquid fuel may be supplied to the engine cylinder through the above-described nozzle from a supply conduit 28 (Fig. 2) which communicates with a fuel passage 29 provided in body 10. Said passage communicates with pressure chamber 20 through an opening in plate 23 and a passage 30 in guide member 18. Thus, when pressure is applied to the fuel in supply line 28 and, hence, in chamber 21, valve 19 will be lifted from its seat against the yielding pressure of spring 24 and a charge of fuel will be injected into the engine cylinder through passages 21 and 22. The opening movement of valve 19 is limited, as pointed out above, by plate 23 so that the valve will be quickly seated again by spring 24 as soon as the fluid pressure in chamber 20 is reduced.

In the form shown, the circulatory system for a cooling medium within nozzle N comprises a cup-like shell or casing member 31, which slidably extends through the reduced portion of sleeve nut 14 and has an external flange 32 that extends between shoulder 16 of said nut and an external shoulder on the enlarged upper end of spray tip 17. The lower reduced end of member 31 is internally threaded for cooperation with the externally threaded lower end of spray tip 17. The engaging shoulders of members 17 and 31 form a fluid and gas-tight seal. Within member 31 an intermediate portion of nozzle tip 17 is preferably undercut to thereby form the inner wall of an annular cooling chamber 33.

Shell or casing 31 is preferably constructed of stainless steel or other suitable metal so that the wall thereof may be relatively thin and flexible and yet be able to withstand the high heat and pressure to which it must be subjected. In assembling the nozzle, a tight joint is first effected at the engaging shoulders adjacent the lower ends of members 17 and 31 by threading member 31 onto member 17. Member 31 is so constructed that when it is thus applied to member 17 there is a very slight clearance between flange 32 and the enlarged or flanged upper end of member 17, thereby insuring a tight seal when flange 32 is clamped between shoulder 16 of nut 14 and tip member 17. By reason of the flexibility of the flange 32, the slight clearance between it and member 17, as mentioned above, is taken up when nut 14 is screwed tightly into place.

A suitable cooling medium may be conducted to and from chamber 33 through passages 35 and 36 in body 10, suitably positioned openings in plate 23, passages 37 and 38 in guide member 18, and openings 39 and 40 in the flanged upper portion of tip piece 17. Preferably the lower ends of passages 37 and 38 communicate with arcuate grooves 41 and 42 in the lower face of guide member 18. Each of said grooves extends less than 180°, but taken together they substantially surround the seat for needle valve 19 so that the cooling medium will maintain this vital portion of the injection nozzle at a comparatively low temperature.

Novel means are provided for supplying air as a cooling medium to chamber 33 and the other cooling passages of nozzle N. In the form shown, said means comprises a scoop 43 positioned in the intake passage 8 of the engine and connected by means of a suitable conduit 44 to passage 35 in the nozzle. Thus, when air is drawn into cylinder 5 during the normal operation of the engine, a portion of the air rushing through passage 8 is picked up by scoop 43 and directed through the cooling passages of the nozzle and exhausted to atmosphere through a conduit 45 connected with the outer end of passage 36. The air thus circulated through the nozzle is ordinarily cleaned by passage through a suitable cleaner before it enters the intake manifold of the engine. Large quantities of air may thus be circulated through the nozzle at a relatively high speed, thereby effecting satisfactory and economical cooling of the injection nozzle. If desired, the exhaust from conduit 45 may be diverted by a suitable valve V and a conduit 45a to intake passage 8 at a point of low pressure, thereby increasing the pressure differential between the inlet and outlet of the nozzle cooling system.

The invention also contemplates the circulation of air through nozzle N by the application of suction to one of the passages 35 or 36. As shown in Fig. 3, passage 35 is connected through a pipe 44' and a conduit 46 in cylinder head 7' to the intake passage 8' of the engine in such a manner that the suction created during the intake stroke of the engine piston is effective to draw cooling air through the nozzle from inlet conduit 45'. If desired, the cooling air may be supplied to conduit 45' by a suitable compressor or pump 47 and exhausted through passage 35 of the nozzle either to atmosphere or, as illustrated in Fig. 3, to intake passage 8' through conduits 44', 46 for the purpose of supercharging the engine cylinder.

There is thus provided novel apparatus embodying novel means and employing a novel method for cooling injection nozzles of solid fuel injection engines. Said apparatus is so constructed as to occupy a minimum of space in the cylinder head or the like. Additionally, air is employed as the cooling medium whereby the cooling passages may be made relatively small to obtain adequate cooling without the necessity for frequent cleaning and overhauling of the nozzle. The life as well as the efficiency of the nozzle is materially increased.

Although only a limited number of the embodiments of the invention are illustrated and described in detail, it is to be expressly understood that the invention is not limited thereto. For example, the invention is applicable to two-stroke cycle engines as well as to four-stroke cycle engines and air may be supplied simultaneously to all of the nozzles of a multi-cylinder engine from a common manifold connected to one or more of the engine intake passages or other sources of suction or compression to thereby insure a continuous flow of air through each of the injection nozzles. Various changes may also be made in the design and arrangement of parts illustrated without departing from the spirit and scope of the invention as the same will now be understood by those skilled in the art. For a definition of the limits of the invention, reference is had primarily to the appended claims.

What is claimed is:

1. The combination with an internal combustion engine having an intake passage of a fuel injection nozzle having cooling passages therein, an air scoop in said intake passage of the engine, and means connecting said scoop with said nozzle whereby air is directed from said intake passage through said cooling passages during operation of the engine.

2. The combination with an internal combustion engine having an intake passage of a fuel injection nozzle having cooling passages therein, and means including air deflecting means extending into the air stream flowing through said intake passage for directing air to said cooling passages for cooling said nozzle.

3. The combination with an internal combustion engine having an intake passage of a fuel injection nozzle having cooling passages therein, means for diverting air from said intake passage through the cooling passages in said nozzle, and means for directing air from said cooling passages to said intake passage.

4. The combination in an internal combustion engine having an intake passage of a fuel injection nozzle having passages for a cooling medium therein, means for diverting air from said intake passage through the passages in said nozzle, and means for directing air from said last-named passages to said intake passage at a point of low pressure.

ALBERT T. BREMSER.